(12) United States Patent
McKay

(10) Patent No.: US 6,349,798 B1
(45) Date of Patent: Feb. 26, 2002

(54) BRAKE ASSEMBLY

(75) Inventor: Richard John McKay, Stafford (GB)

(73) Assignee: Lucas Industries Limited, London (GB)

(*) Notice: Subject to any disclaimer, the term of this patent is extended or adjusted under 35 U.S.C. 154(b) by 0 days.

(21) Appl. No.: 09/426,244

(22) Filed: Oct. 25, 1999

(30) Foreign Application Priority Data

Oct. 28, 1998 (GB) ............................................. 9823599

(51) Int. Cl.$^7$ .............................................. F16D 66/00
(52) U.S. Cl. ........................... 188/1.11 E; 188/1.11 W; 303/122.03
(58) Field of Search ....................... 188/1.11 R, 1.11 W, 188/1.11 L, 1.11 E, 71.5; 303/122.03

(56) References Cited

U.S. PATENT DOCUMENTS

| | | | |
|---|---|---|---|
| 4,176,733 A | 12/1979 | Twickler | 188/134 |
| 4,625,843 A | 12/1986 | Maltby et al. | 192/8 R |
| 4,708,255 A | * 11/1987 | Feldman et al. | 188/1.11 L |
| 5,279,394 A | * 1/1994 | Wollenweber et al. | 188/1.11 L |
| 5,419,620 A | * 5/1995 | Keschwari-Rasti | 303/3 |
| 5,555,962 A | 9/1996 | Hinterlechner | 192/12 R |
| 5,601,169 A | 2/1997 | Wodecki | 192/56.33 |
| 5,975,250 A | * 11/1999 | Brandmeier et al. | 188/1.11 W |
| 5,992,579 A | * 11/1999 | Kyrtsos | 188/1.11 L |
| 6,000,507 A | * 12/1999 | Bohm et al. | 188/158 |
| 6,059,379 A | * 5/2000 | Demi et al. | 303/15 |

FOREIGN PATENT DOCUMENTS

| | | | | |
|---|---|---|---|---|
| EP | 0 878 635 A1 | 11/1998 | | |
| GB | 2 315 527 A | 2/1998 | | |
| GB | 2315527 | * 4/1998 | | 188/1.11 E |

\* cited by examiner

Primary Examiner—Robert J. Oberleitner
Assistant Examiner—Devon Kramer
(74) Attorney, Agent, or Firm—Gottlieb, Rackman & Reisman, P.C.

(57) ABSTRACT

A brake assembly of the constant friction type has a rotary transmission shaft fitted with a constant friction brake device including a first set of friction plates carried on the shaft and a second set of friction plates interleaved with the friction plate and mounted on a friction element support. The friction brake device acts on the shaft to apply a braking torque thereto in at least one direction of rotary movement. The friction element support is rotatable relative to the shaft and to a housing of the assembly. A detent mechanism acts between the housing and the friction element support so as to retain the support against rotation below a predetermined braking torque. A signalling means such as a proximity sensor is arranged to be operated when the friction element support moves relative to the housing.

7 Claims, 1 Drawing Sheet

BRAKE ASSEMBLY

Figures 1, 2:
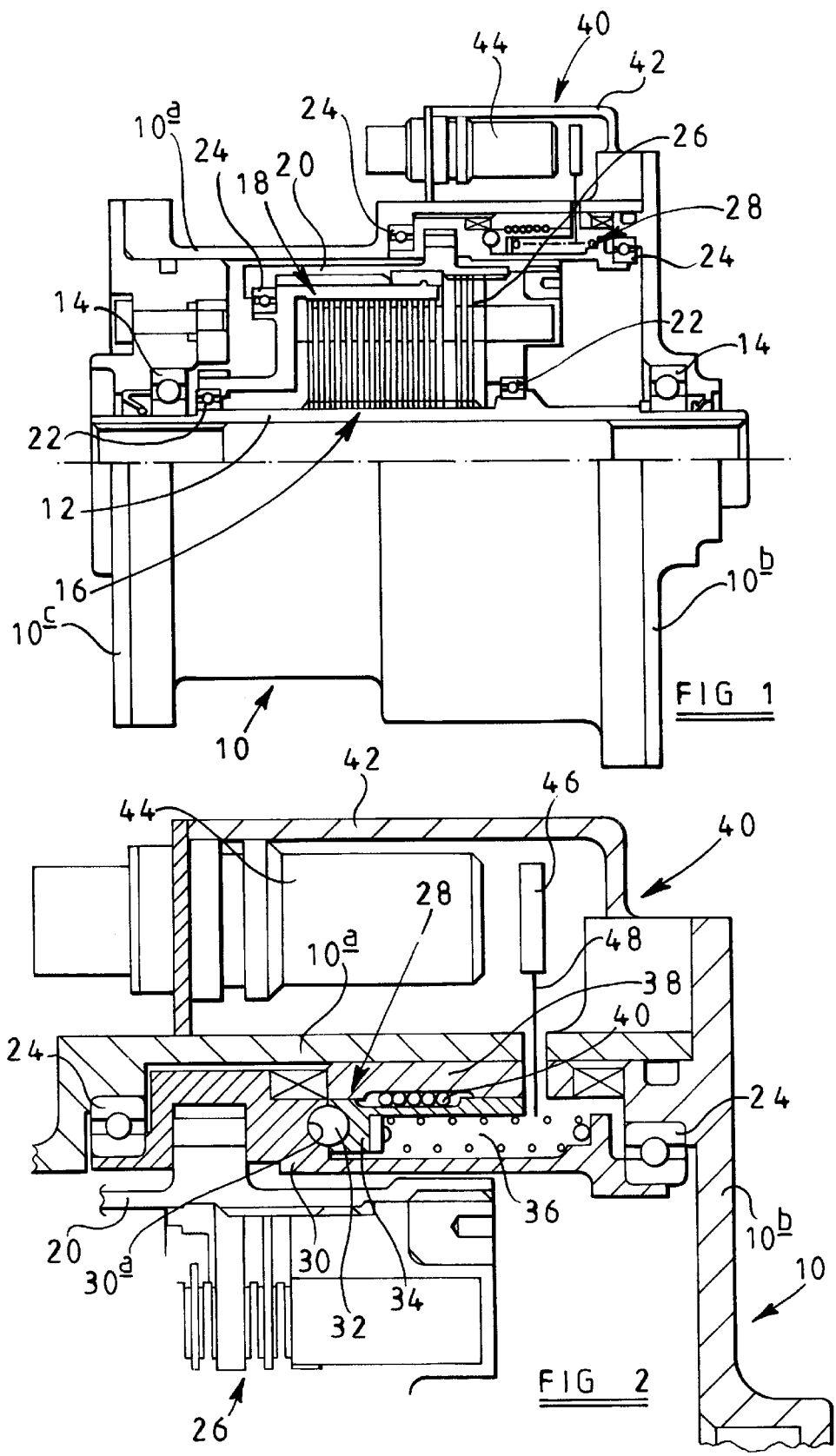

This invention relates to a brake assembly and is more particularly concerned with a brake assembly of the constant friction type where a sufficient level of braking torque is required to be applied to a rotary drive shaft in at least one direction of rotation thereof.

Constant friction brake assemblies are used on rotary drive shafts for controlling aircraft wing flaps. Typically, when the flap is being extended, the load applied to the flaps by the airflow passing over them acts in the opposing direction to the force being applied by the operating shaft. Under this condition, it is necessary to reduce friction provided by the brake. When the flap is being retracted, the load applied to the flap by the airflow assists in the retraction and so, in this direction of rotation of the drive shaft, the brake assembly acts to provide a greater braking effect. It is common with this type of system to provide a brake assembly where the brake automatically operates on failure. This has the advantage that, when a failure occurs, e.g. a shaft breakage, the friction brake should be able to hold the load assuming that the load tends to blow the flaps up, i.e. in the retracting direction. The benefit of this type of constant friction brake is that it acts automatically, i.e. does not require to be signalled to operate.

There is a need to check for dormant faults in the brake assembly, and this is currently done by a physical check only at pre-determined periods; dormant faults may thus exist between checks and the detection of failure is dependent on the correct scheduling of maintenance.

It is an object of the present invention to provide an improved brake assembly which can enable rapid and reliable identification of a braking fault.

According to the present invention, there is provided a brake assembly comprising a rotary member; a constant friction brake device acting on the rotary member to apply a braking torque to the rotary member in at least one direction of rotary movement of the latter; and signalling means for signalling when a predetermined braking torque has been exceeded.

Thus, the present invention can enable a positive signal to be given each time the brake device has operated satisfactorily. Accordingly, failure of the signalling means to signal indicates the need to inspect for a potential failure of the brake assembly.

In a preferred embodiment, the constant friction brake device comprises:
at least one first friction element mounted for rotary movement with the
rotary member,
a fixed member,
a friction element support mounted for rotation relative to the fixed member,
at least one second friction element mounted on the friction element support so as to be frictionally engageable with said at least one first friction element in at least one direction of rotary movement of the rotary member; and
a detent mechanism acting between the fixed member and the friction element support, said detent mechanism being adapted to retain the friction element support against rotation below said predetermined braking torque;
and wherein the signalling means is arranged to signal when the detent mechanism has operated to permit relative rotation between the friction element support and the fixed member.

The detent mechanism may be a resilient latch mechanism (e.g. a ball and recess mechanism) such that disengagement of the latch permits rotation of the friction element support relative to fixed member. Alternatively, a pre-loaded spring or other pre-loaded compliant member may be used.

The signalling means may include a proximity switch which is arranged to be actuated when the friction element support moves relative to the fixed member. Instead of using a proximity switch, a microswitch or other type of relative movement sensor may be employed, e.g. a linear variable differential transducer.

An embodiment of the present invention will now be described, by way of example, with reference to the accompanying drawing, in which:

FIG. 1 is a side elevation, partly in section, of one embodiment of brake assembly according to the present invention, and FIG. 2 is a view on a larger scale of the encircled part of the assembly illustrated in FIG. 1.

Referring to the drawings, the brake assembly in this embodiment is a constant friction brake assembly of the bi-directional type for use in an aircraft wing flap control system. The brake assembly comprises a fixed housing 10 in which a central transmission shaft 12 is rotatably mounted in bearings 14. The housing 10 comprises a peripheral side wall 10a and end walls 10b and 10c.

The transmission shaft 12 carries a first set of friction plates 16 for rotation therewith. A second set of friction plates 18 is interleaved with the first set and is mounted on a friction element support 20 which is mounted within the housing 10 via inner and outer sets of bearings 22 and 24. In this way, the transmission shaft 12 is rotatable relative to the friction element support 20 which is rotatable relative to both the shaft 12 and the housing 10. A detent mechanism 28 (to be described in detail below) is provided for releasably retaining the support 20 against rotation.

The brake system comprises a further set of friction plates 26 which serve as so-called "extend" friction plates for operation during flap extension. The second set of friction plates 18 serve as so-called "retract" friction plates for operation during flap retraction. The manner in which these sets of friction plates 18 and 26 operate is per se known in the art and will not be described any further except to state that each set 18 and 26 automatically applies a braking torque to the first set of friction plates 16 when the shaft 12 is rotated in a respective direction but is "ratcheted" so as to be resiliently urged out of engagement with the friction plate 16 when the transmission shaft 12 is rotated in the opposite respective direction. With such an arrangement, it is possible to arrange for the braking torque applied via the friction plates 26 to the transmission shaft 12 when it is moving in a "flaps extend" direction to be less than the braking torque which is applied to the transmission shaft 12 via the friction plates 18 when the transmission shaft 12 is rotating in the "flaps retract" direction.

In order to detect that the required brake torque is exceeded, a detent mechanism 28 is provided between the friction element support 20 and side wall 10a of housing 10. The detent mechanism 28 is shown in greater detail in FIG. 2 and comprises a ball cup member 30 defining a ball cup 30a in which a ball 32 carried by a ball back-up member 34 is urged by means of a detent spring 36. The ball cup member 30 is fixed to the friction element support 20 so as to be rotatable therewith. The support 20 is mounted on the outer set of bearings 24 through the intermediary of the member 30. The ball back-up member 34 is guided in its movement by means of a ball spline 38 in which balls 40 are engaged in aligned grooves in the ball spline 38 and in the back-up member 34. The ball spline 38 enables the ball back-up member 34 and ball 32 to move with minimum friction. The ball spline 38 is fixed to the inside of the side wall 10a.

In use, when the brake assembly is operating correctly, the braking torque which occurs between the ball cup member 30 and the ball 32 will rise to above a predetermined level at which the ball 32 is urged out of the ball cup member 30 against the action of the detent spring 36 so as to permit rotation of the friction element support 20 and the friction plates 18 and 26. This is a so-called "break-out" condition which is normal. If this break-out condition does not occur during normal operation, then this is indicative of an inherent braking fault causing an inadequate braking torque to be applied to the transmission shaft 12.

In accordance with the present invention, a signalling means is provided to signal whenever "break-out" of the ball 32 taken place. Thus failure of the signalling means to signal ball break-out is indicative of an inherent fault in the system. In this embodiment, the signalling means is indicated by arrow 40 and is housed mainly within a sub-housing 42 secured to the outside of side wall 10a of the housing 10. Disposed within the sub-housing 42 is a proximity sensor 44 and a proximity sensor target 46. The proximity sensor target 46 is mounted on an operating arm 48 which extends with clearance through aligned slots in the housing wall 10a and the ball spline 38 to terminate at its lower end (as viewed in FIG. 2) adjacent to an end of the ball back-up member 34 remote from the ball 32. The arrangement is such that, when the ball 32 breaks out from the cup 30a, the ball back-up member 34 moves to the right as viewed in FIG. 2 against the action of the spring 36. This causes the right hand end of the back-up member 34 to engage against the operating arm 48 to move the sensor target 46 relative to the proximity sensor 44, thereby enabling the sensor 44 to emit a signal indicative of the fact that ball break-out has taken place. This signal may be transmitted to any appropriate remote location, for example the aircraft cockpit or to a flap control computer so that operation of the sensor can be monitored.

I claim:

1. A brake assembly comprising a rotary member; a constant friction brake device acting on said rotary member to apply a braking torque of a predetermined value to said rotary member in at least one direction of rotary movement of the latter; at least one first friction element mounted for rotary movement with said rotary member; a fixed member; a friction element support mounted for rotation relative to said fixed member; at least one second friction element mounted on said friction element support so as to be frictionally engageable with said at least one first friction element in at least one direction of rotary movement of said rotary member; a detent mechanism acting between said fixed member and said friction element support, said detent mechanism being adapted to retain said friction element support against rotation below said predetermined braking torque; and a signalling member, said signalling member being arranged to signal when said detent mechanism has operated to permit relative rotation between said friction element support and said fixed member to prevent exceeding of the predetermined value of said braking torque.

2. A brake assembly according to claim 1, wherein said detent mechanism is a resilient latch mechanism in such manner that disengagement of the latch permits rotation of the friction element support relative to said fixed member.

3. A brake assembly according to claim 2, wherein said resilient latch mechanism includes a ball, a recess and a detent spring resiliently urging the ball into the recess.

4. A brake assembly comprising a rotary member; a constant friction brake device acting on said rotary member to apply a braking torque of a predetermined value to said rotary member in at least one direction of rotary movement of the latter; and a signalling member for signalling when said predetermined braking torque has been exceeded, said signalling member including a movement sensor which is arranged to be actuated when said friction element support moves relative to said fixed member.

5. A brake assembly according to claim 4, wherein said movement sensor comprising a switch.

6. A brake assembly comprising a rotary member; a constant friction brake device acting on said rotary member to apply a braking torque of a predetermined value to said rotary member in at least one direction of rotary movement of the latter; at least one first friction element mounted for rotary movement with said rotary member; a fixed member; a friction element support mounted for rotation relative to said fixed member; at least one second friction element mounted on said friction element support so as to be frictionally engageable with said at least one first friction element in at least one direction of rotary movement of said rotary member; a detent mechanism acting between said fixed member and said friction element support, said detent mechanism being adapted to retain said friction element support against rotation below said predetermined braking torque; and a signaling member, said signaling member being arranged to signal when said detent mechanism has operated to permit relative rotation between said friction element support and said fixed member to prevent exceeding of the predetermined value of said braking torque;

wherein said detent mechanism is a resilient latch mechanism in such manner that disengagement of the latch permits rotation of the friction element support relative to said fixed member.

7. A brake assembly according to claim 6, wherein said resilient latch mechanism includes a ball, a recess and a detent spring resiliently urging the ball into the recess.

* * * * *